United States Patent [19]
Hehl

[11] Patent Number: 5,052,910
[45] Date of Patent: Oct. 1, 1991

[54] CLAMPING UNIT FOR INJECTION MOLDING MACHINE

[76] Inventor: Karl Hehl, Arthur-Hehl-Str. 32, D-7298 Lossburg 1, Fed. Rep. of Germany

[21] Appl. No.: 450,258

[22] Filed: Dec. 13, 1989

[30] Foreign Application Priority Data

Dec. 31, 1988 [DE] Fed. Rep. of Germany ....... 3844432

[51] Int. Cl.$^5$ .............................................. B29C 45/80
[52] U.S. Cl. .................. 425/150; 425/451.9; 425/589; 425/595
[58] Field of Search ............... 425/150, 589, 590, 595, 425/450.1, 451.9

[56] References Cited

U.S. PATENT DOCUMENTS

| 4,380,427 | 4/1983 | Hehl | 425/590 |
| 4,565,116 | 1/1986 | Hehl | 425/590 |
| 4,846,664 | 7/1989 | Hehl | 425/589 |

FOREIGN PATENT DOCUMENTS

281329 9/1988 European Pat. Off. .

Primary Examiner—Timothy Heitbrink
Attorney, Agent, or Firm—Spencer & Frank

[57] ABSTRACT

A clamping unit has a hydraulic actuating assembly including at least two locking cylinders provided with respective locking pistons, which are connected by piston rods to a movable mold carrier. Each locking cylinder contains a high-pressure chamber and a low-pressure chamber, which are adapted to communicate with each other through overflow passages formed in the associated locking piston. The overflow passages can be shut off by valve members. The hydraulic actuating assembly has an axis of symmetry, on which a drive cylinder and a buffer cylinder are centered. The drive cylinder serves to close and open the injection mold. The buffer cylinder is connected to the movable mold carrier and has a buffer chamber, which communicates with the low-pressure chambers of the locking cylinders. The locking cylinders and the buffer cylinder have steel tubes, which are connected at both ends to common cylinder covers to constitute a unit. The drive cylinder is coaxially surrounded by the steel tube of the buffer cylinder. The steel tubes of at least two locking cylinders are symmetrical to the drive cylinder.

18 Claims, 8 Drawing Sheets

CLAMPING UNIT FOR INJECTION MOLDING MACHINE

BACKGROUND OF THE INVENTION

1. Field of the Invention

This invention relates to a clamping unit of an injection molding machine, which clamping unit comprises a stationary mold carrier, a movable mold carrier, which is movable to and from a clamping position relative to said stationary mold carrier, and hydraulic actuating means for actuating said movable mold carrier, which actuating means comprise a hydraulic locking or power cylinder for applying to said movable mold carrier a locking pressure for locking said movable mold carrier in said clamping position. Said hydraulic locking cylinder contains a piston, which is connected by a piston rod to the movable mold carrier and defines on said cylinder a high-pressure chamber and a low-pressure chamber, which communicates with said high-pressure cylinder through at least one overflow passage. Said actuating means also comprise a hydraulic drive cylinder for moving said movable mold carrier to and from said clamping position. That drive cylinder is symmetrical to an axis of symmetry of the actuating means, and a buffer or compensating cylinder, which has a buffer chamber that communicates with the low-pressure chamber of the locking cylinder.

2. Description of the Prior Art

A known clamping unit of that kind has been disclosed in U.S. Pat. No. 4,846,664, and permits an operation at relatively high speed because the buffer or compensating cylinder causes almost the entire hydraulic oil to remain in the actuating means throughout the operation. A single central hydraulic locking or power cylinder is provided as well as two diametrically opposite buffer or compensating cylinders. But the arrangement of the drive cylinder in a central cavity of the piston rod of the locking or power cylinder and the fact that the locking or power cylinder consists of a steel tube render the supply of the hydraulic fluid to the valve which controls the overflow passage in the piston of the locking cylinder rather difficult.

In another known clamping unit, two cup-like locking cylinders made of cast iron are arranged diametrically opposite to each other on both sides of a central cuplike buffer cylinder made of cast iron and at that end which is nearer to the mold are secured to a mounting plate. A hydraulically separate drive cylinder is disposed in each locking cylinder. The valve member of the valve for controlling the overflow passages in the locking piston is moved to a closed position by pressure applied from the high-pressure chamber and to an open position by pressure applied from a valve chamber. The rate at which the valve can be actuated will be restricted by that design and that mode of operation. Besides, it is very difficult in practice to synchronize the movements of two drive cylinders with sufficient accuracy (EP 0281329, FIG. 8).

SUMMARY OF THE INVENTION

In view of the prior art discussed hereinbefore it is an object of the invention to provide a clamping unit which is of the kind described first hereinbefore with hydraulic actuating means which can be made at lower cost and which constitute a compact arrangement.

That object is accomplished in accordance with the invention in that the drive cylinder is coaxially surrounded by the buffer cylinder, the piston of the buffer cylinder is secured to the drive cylinder, and at least two locking cylinders are provided, which are symmetrically arranged with respect to the drive cylinder.

Figure 7:
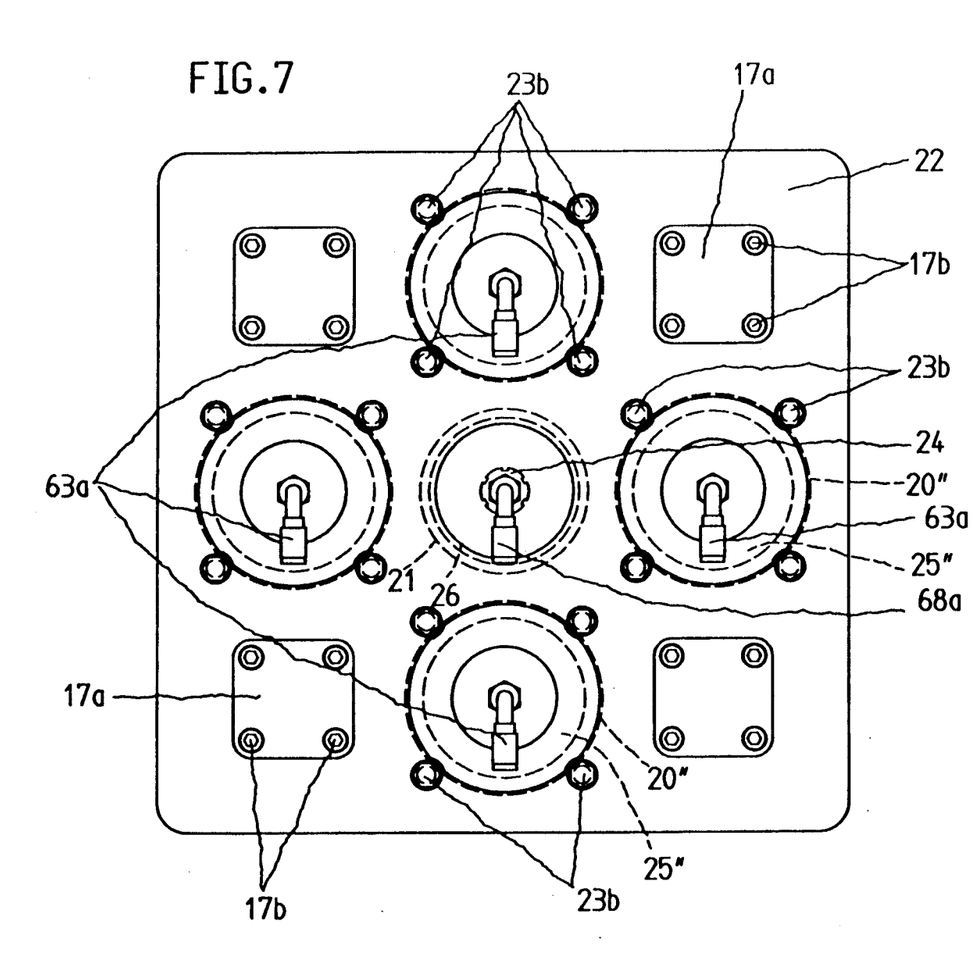
FIG. 7 is a view that is similar to FIG. 6 and shows a modified clamping unit comprising four locking cylinders.

Because the piston rods associated with the locking cylinders are not connected to a drive cylinder, said piston rods may have smaller dimensions so that the low-pressure chambers may have larger volumes. As a result, the requirement that in any operating position of the actuating means the total volume of the low-pressure chamber and of the buffer chamber should nearly equal the total volume of the high-pressure chambers can more easily complied with. Thereby the total volume of hydraulic oil can be nearly constant in all hydraulic cylinders of the actuating means of the clamping unit. This volume may be not the same in clamping and opening position to obtain an exchangement of the hydraulic oil within a certain time. Within the scope of the invention an arrangement as shown in FIG. 7 may be adopted, in which a higher locking pressure can be applied because additional locking cylinders are provided and this will not appreciably add to the costs of manufacturing the hydraulic actuating means in series.

A valve may be provided by which the overflow passage can be shut off and the low-pressure chamber may communicate with the buffer chamber of the buffer cylinder, which contains a buffer piston that is connected by a piston rod to the movable mold carrier. The locking and buffer cylinders may consist of respective steel tubes and may be provided with common cylinder covers, which are so connected to said steel tubes that said locking and buffer cylinders constitute a compact unit. In that arrangement the clamping unit will comprise only a single drive cylinder, which is centered on the axis of symmetry of the actuating means. Because the piston rods are relatively small, the valves for controlling the overflow passages in the locking pistons may be supplied with hydraulic fluid through central bores in the associated piston rods in such a manner that the pressure for closing the valves is applied from the valve chambers so that the valves can be actuated at extremely high speed and the manufacture will be facilitated. If the cylinders consist of steel tubes, locking cylinders and locking pistons for applying predetermined different predetermined locking pressures may be assembled from a set of components consisting of steel tubes, piston skirts, piston cores, piston rods. Because only one drive cylinder is provided, there will be no risk of an overloading of the sliding surface bearings owing to an insufficient synchronization of two parallel drive cylinders.

In a preferred embodiment the drive cylinder extends through the piston of the buffer cylinder and into a recess formed in the rear cylinder cover. The movable mold carrier may be guided on four track rods, which are secured at one end to the stationary mold carrier and at the other end to the rear cylinder cover for the locking and buffer cylinders. Said track rods comprise two lower track rods, the axes of which lie in a horizontal plane and which extend through the forward cylinder cover, which is adjacent to the movable mold carrier and are guided and centered by said forward cylinder cover. In that case the clamping unit will have particularly compact actuating means.

The lower track rods may be supported on the pedestral of the injection molding machine by a vertical supporting plate, which extends between the cylinder covers and is provided with sleeves and the track rods extend through and are slidable in said sleeves. In that case the manufacture will be facilitated because the cyclic axial expansion and contraction of the track rods can be taken up by axial movements of said track rods in the guiding sleeves mounted in the supporting plate and it will no longer be necessary to provide the compensating means which will be required if the track rods are fixed to a supporting plate which is mounted on the machine pedestal.

DETAILED DESCRIPTION OF THE PREFERRED EMBODIMENTS

Illustrative embodiments of the invention will now be described with reference to the drawing.

The clamping unit comprises a stationary mold carrier 11, a rear cylinder cover 22 associated with a plurality of hydraulic cylinders, and four track rods 16, 16'. The track rods, the stationary mold carrier 11 and the rear cylinder cover 22 constitute a rigid frame. A box-like movable mold carrier 13 is slidable on the track rods 16, 16' and comprises two spaced apart plates, which are interconnected by supporting ribs. Mountings 17 connecting the track rods 16, 16' to the stationary mold carrier 11 and to the rear cylinder cover 22 comprise two abutment plates 17a, bolts 17b and tapped sleeves 17c, which are screwed on external screw threads of the associated track rods 16, 16'. The bolts 17b bear on the abutment plates 17a and are screwed into the rear cylinder cover 22 and the stationary mold carrier 11. The abutment plates 17a are supported on the adjacent tapped sleeves 17c but are spaced from the end faces of the associated track rods 16, 16'. The track rods 16, 16' extend through the rear cylinder cover 22 and the stationary mold carrier 11 with a clearance. In this arrangement the tapped sleeves 17c are axially fixed to the track rods 16, 16' and are forced by the bolts 17b against the rear cylinder cover 22 and the stationary mold carrier 11. A single hydraulic drive cylinder 27 for closing and opening the injection mold 78, which is supported by the stationary and movable mold carriers 11, 13 is centered on the axis of symmetry a—a of the hydraulic actuating means of the clamping unit. The drive cylinder 27 is coaxially disposed within a buffer cylinder 21, 26 and constitutes a piston rod for that buffer cylinder. The piston 26 associated with the buffer cylinder 21 is mounted on the drive cylinder 27. The piston rod 47 associated with the drive cylinder 27 is axially fixed at its rear end by nuts 24 to the rear cylinder cover 22, which covers all hydraulic cylinders of the hydraulic actuating means of the clamping unit at their rear end. Two diametrically opposite hydraulic locking cylinders 20 are provided on both sides of the buffer cylinder 21 and serve to apply a locking pressure to the injection mold 78. The axes of the locking cylinders 20 lie in a horizontal plane. The locking pistons 25 associated with the locking cylinders 20 are connected by piston rods 28 to the movable mold carrier 13. In each locking cylinder 20 the associated locking piston 25 defines a high-pressure chamber 52 and a low-pressure chamber 50, which communicate with each other through overflow passages 42, which are formed in the associated locking piston 25 and are adapted to be closed by means of an annular valve member 43 of a hydraulically operable shut-off valve. The buffer chamber 51 in the buffer cylinder 21 communicates freely with the low-pressure chambers 50 via overflow passages 68b and serves to receive and deliver hydraulic oil from and to the locking cylinders 20. The drive cylinder 27 contains a drive piston 47b, which separates in said drive cylinder 27 a forward cylinder chamber 48 adjacent to the movable mold carrier 13 from a rear cylinder chamber 80, which is sealed at its rear end by a sealing sleeve 44.

The locking cylinders 20 and the buffer cylinder 21 consist of steel tubes, which are connected at their ends to common cylinder covers 22, 12 to constitute a compact unit. The steel tubes terminate at each end in a plane which is at right angles to the axis of symmetry a—a. The drive cylinder 27 is coaxially surrounded by the steel tube of the buffer cylinder 21. The drive cylinder 27 extends through the buffer piston 26, which is associated with the buffer cylinder 21, and into a recess formed in the rear cylinder cover 22, which is made of cast iron. The movable mold carrier 13 is guided on the four track rods 16, 16'. Two lower ones of said track rods are designated 16' and have axes lying in a horizontal plane and extend through and are slidably mounted in sleeves 12a, which are carried by the forward cylinder cover 12. Between the cylinder covers 22 and 12 the lower track rods 16' are supported on the machine pedestal 10 by means of a vertical supporting plate 84, which is provided with sleeves 84a, through which the track rods 16' slidably extend.

Each locking piston 25 comprises a skirt, which is in sliding contact with the steel tube of the locking cylinder 20, and a core 25' which is adapted to extend into a recess formed in the rear cylinder cover 22. The annular valve member 43 associated with each locking piston 25 is slidably mounted on the peripheral surface of the core 25' and is movable to a position for closing the overflow passages 42 at the core 25' by pressure applied from a valve chamber 61.

The steel tubes of each locking cylinder 20 and of the buffer cylinder 21 contact each other at a generatrix and are centered in the cylinder covers 22 and 12. The piston rods 28 connected to the locking pistons 25 extend at their forward end into suitable centering recesses formed in the movable mold carrier 13 and at their rear end in corresponding centering recesses formed in the cores 25' of the locking pistons 25 and are centered in said recesses.

The fluid passages 58 leading to the valve chambers 61 comprise piston rod bores in the piston rods 28 and piston bores in the cores 25'. The ports 58a connected to said passage bores are mounted at the peripheries of the piston rods 28 at locations which in any position of the piston rods 28 will be disposed between the movable mold carrier 13 and the forward cylinder cover 12.

The piston 26 of the buffer cylinder 21 is secured to an annular shoulder of the drive cylinder 27. That annular shoulder is provided on the cylinder 27 at a transition to a rear portion which is smaller in diameter. Each core 25' has a rear end face, which is joined to a valve cup 85, which has an axial flange that surrounds the core 25' with a clearance and together with the valve member 43 defines the valve chamber 61. Pressure applied from the high-pressure chamber 52 will move the valve member 43 to its open position when the valve chamber 61 is pressure-relieved. The piston rods 28 which are associated with the locking cylinders 25 are secured by bolts 86 to the movable mold carrier 13 and said piston rods 28 and the drive cylinder 27 extend through sealing sleeves 30, 29 mounted in the forward cylinder cover 12.

The buffer cylinder 21 contains a hydraulically passive chamber 53, which is open to the atmosphere through radial bores 83 in the rear cylinder cover 22. A displacement sensor 81 for sensing the movement of the movable mold carrier 13 is laterally mounted on that mold carrier, as is apparent from FIG. 8.

Figure 8:
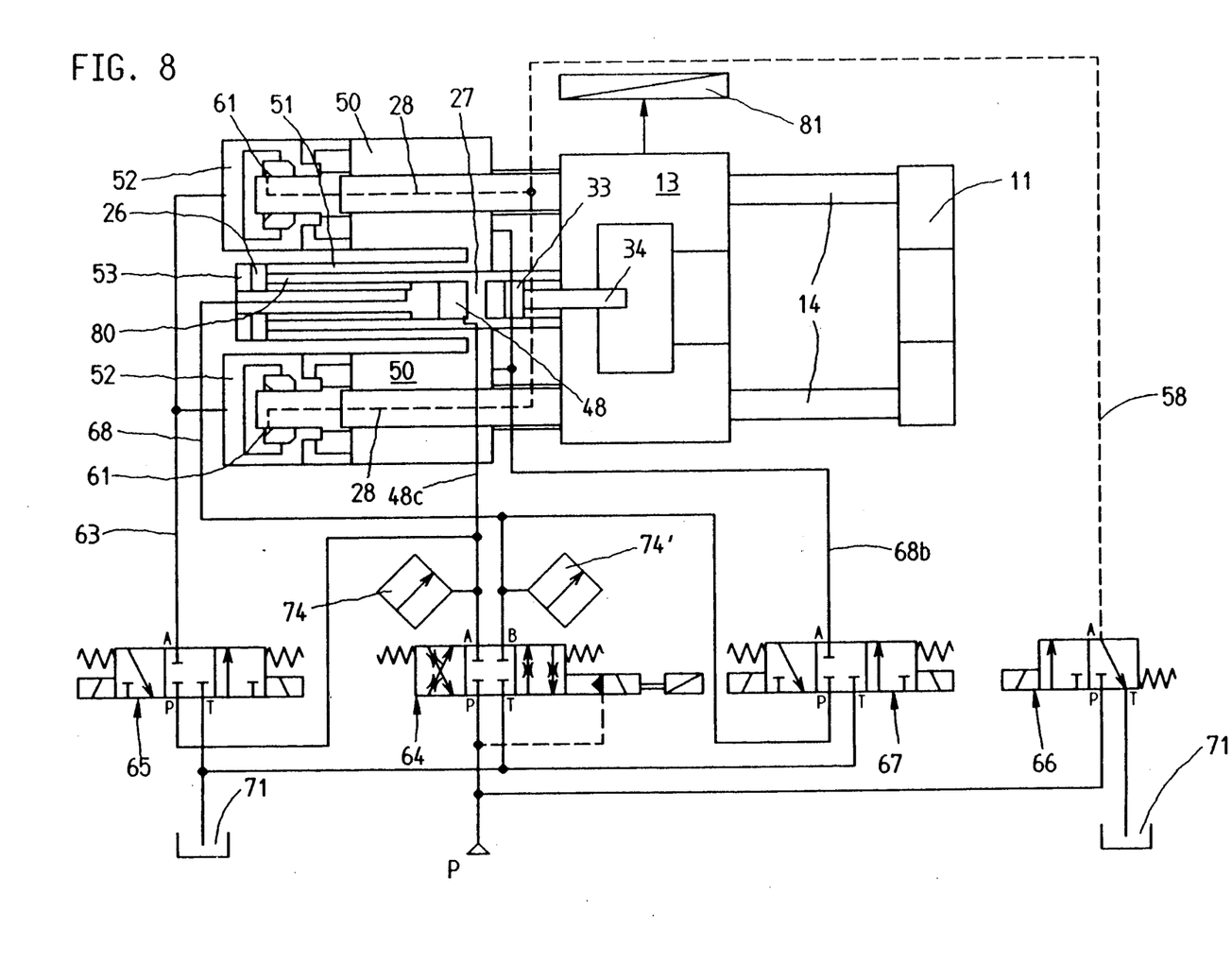
FIG. 8 is a circuit diagram illustrating the hydraulic system of the clamping unit.

The valve chamber 61 is adapted to be connected via the communicating passage 58 and the passage bores in the piston rods 28 and a directional valve 66 as a pilot valve to a pressure line P or to a reservoir 71.

The cylinder chamber 80 is adapted to be connected to the pressure line P via the communicating line 68 and the automatic control valve 64.

The high-pressure chamber 52 is adapted to be connected via a communicating passage 63 and a directional valve 65 to the communicating passage 48c, which communicates with the pressure line P during the operation by which the injection mold 78 is closed.

The forward cylinder chamber 48 of the drive cylinder 27 is adapted to be connected via the communicating passage 48c and the automatic control valve 64 to the pressure line P.

The cylinder chambers (the low-pressure chamber 50 and the buffer chamber 51) of the locking cylinders 20 and of the buffer cylinder 21 communicates with each other via overflow passages 68b and are adapted to be connected to the pressure line P via a communicating passage 68b', the automatic control valve 64 and the directional valve 67. The low-pressure chambers 50 are adapted to be connected to the reservoir 71 by means of the directional valve 67.

The forward end portion 27a of the cylinder 27 and an associated ejector piston 33 constitute an actuator for an ejector rod 34b in the injection mold 78. The ejector rod 34b is connected by a coupling 34a to the piston rod 34, which is connected to the ejector piston 33. The rear cylinder chamber of the actuator 27a, 33 is adapted to be supplied with pressure fluid through a port 57a, and a bore in the cylinder 27. The piston rod 34 is guided in a bushing 87 of the movable mold carrier 13.

The flow paths established for the hydraulic oil for the operations by which the injection mold is opened by a weak force or by a strong force and is closed and locked are specifically apparent from U.S. Pat. No. 4,846,664, the disclosure of which is incorporated herein by reference. Corresponding parts are designated in said U.S. patent and in the present application by the same reference characters.

The modified clamping unit shown in FIG. 7 comprises four locking cylinders 20", 25", which are arranged in pairs in a horizontal plane and in a vertical plane, which planes contain the axis of symmetry a—a.

Figure 1:
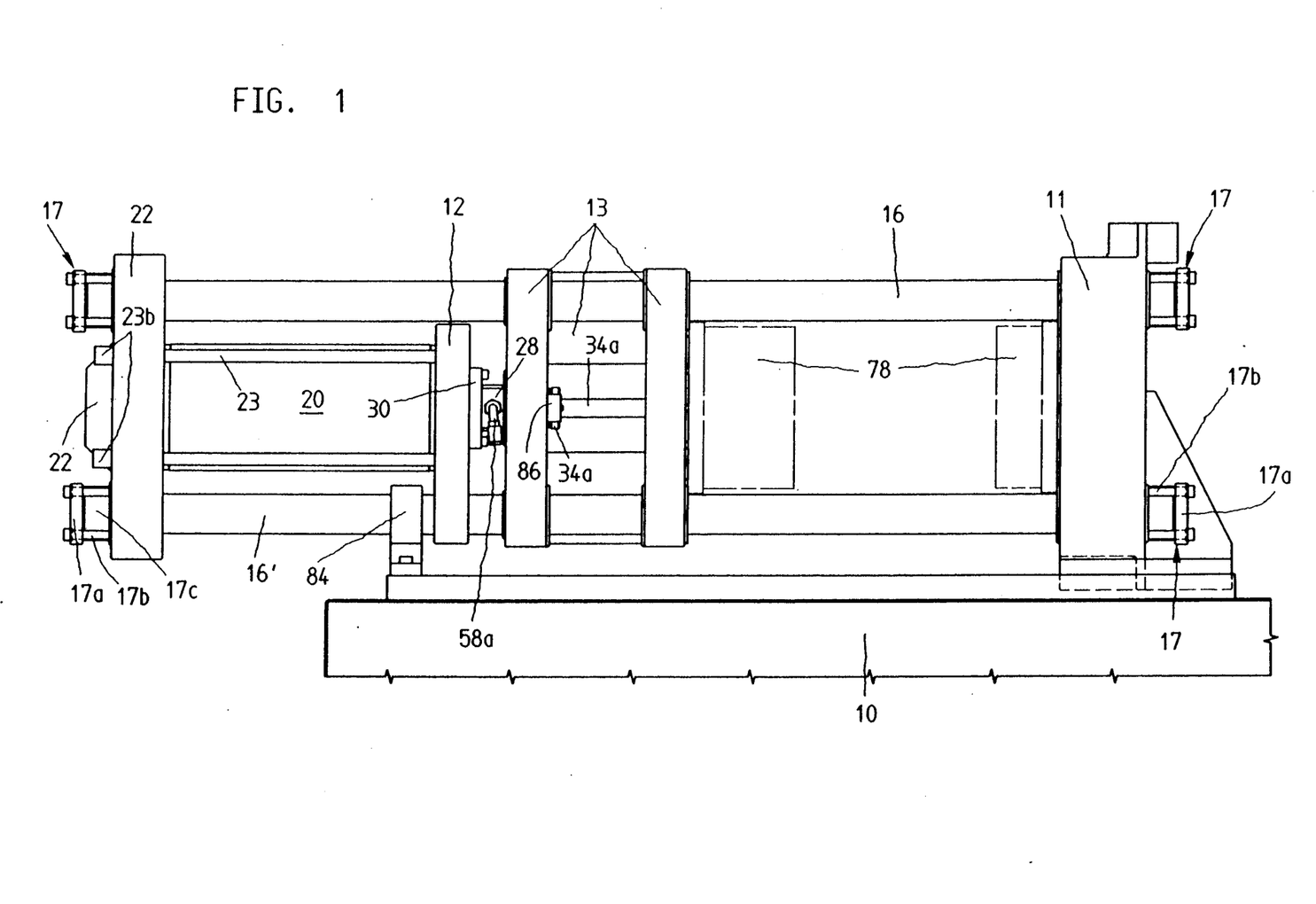
FIG. 1 is a side elevation showing the clamping unit.
Figure 2:
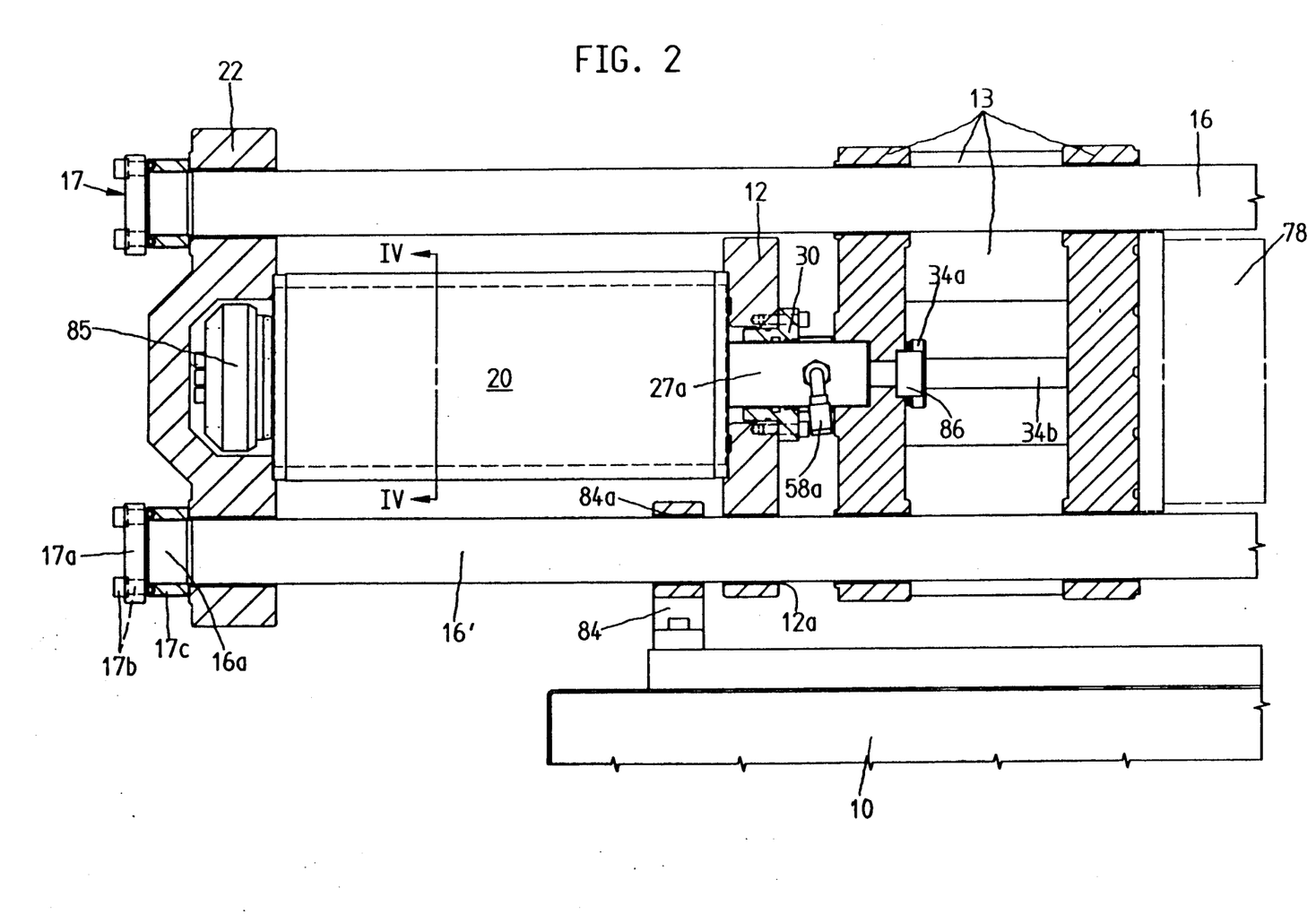
FIG. 2 is an enlarged view showing the clamping unit partly in a section taken on line II—II in FIG. 3 whereas the track rods are not shown in section.
Figure 3:
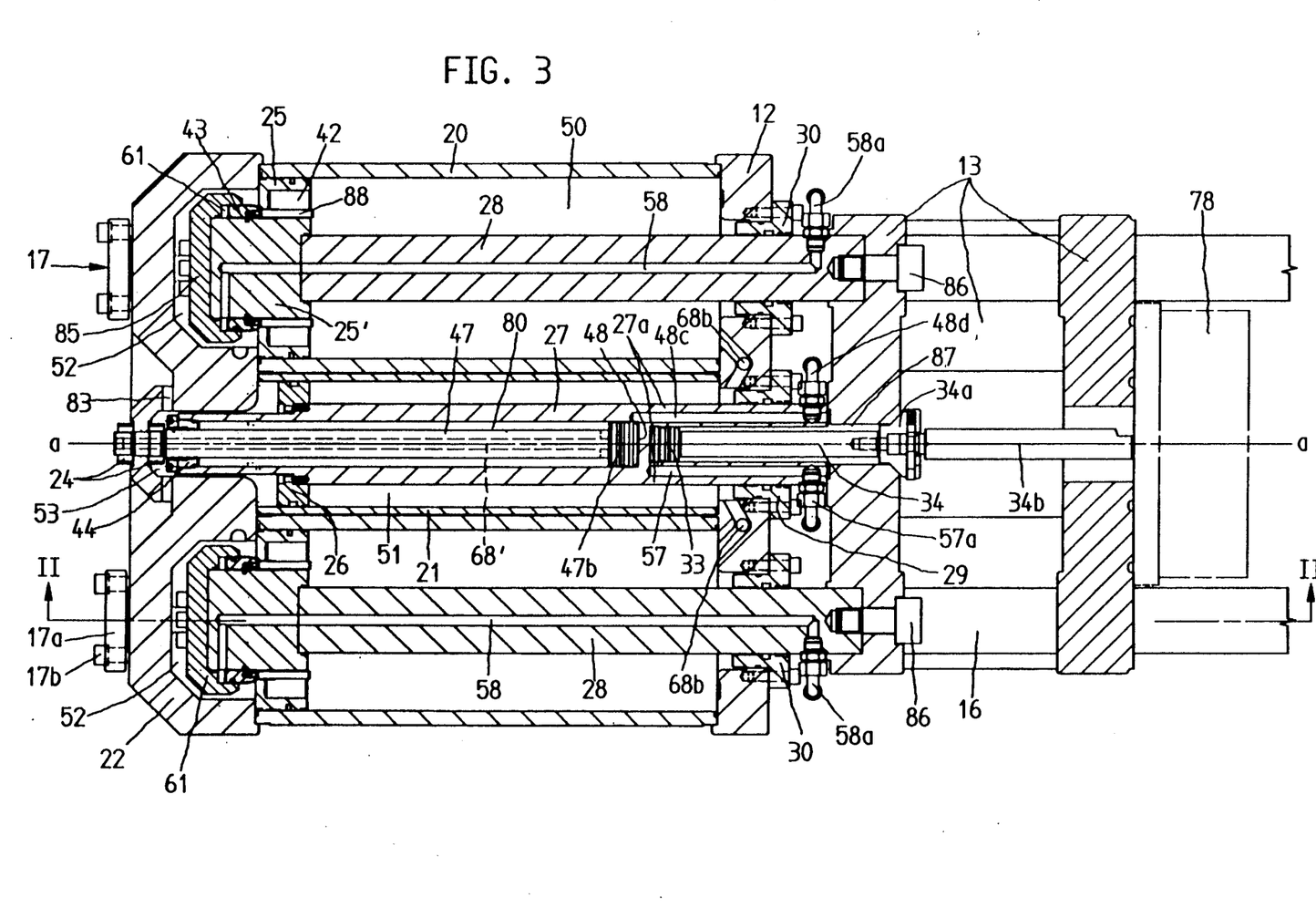
FIG. 3 is a horizontal sectional view taken on a plane extending through the axis of symmetry of the hydraulic actuating means.
Figure 3A:
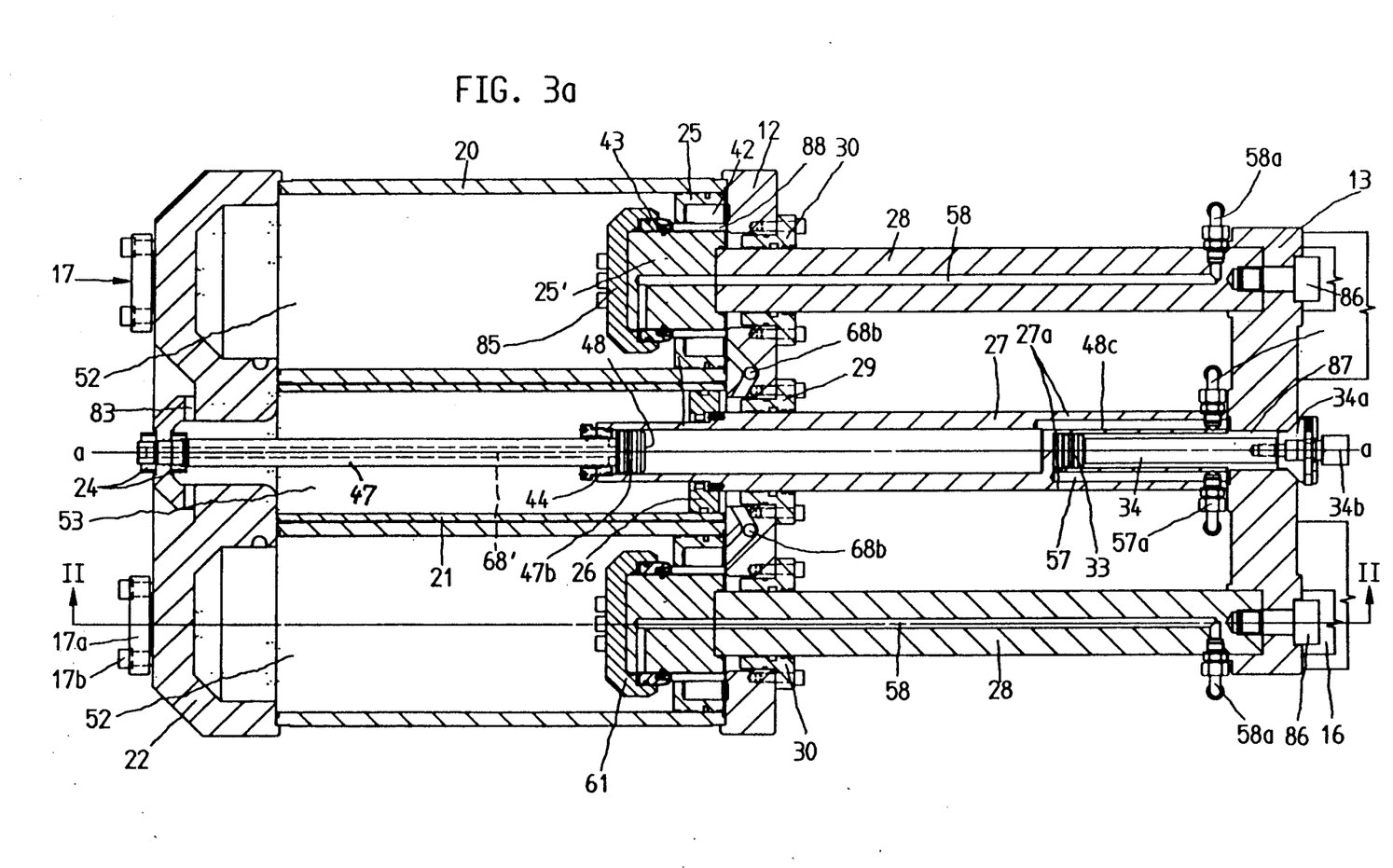
FIG. 3a is a view that is similar to FIG. 3 and shows the clamping unit in a position in which the injection mold is closed and the pins 88 engage the forward cylinder cover.
Figure 4:
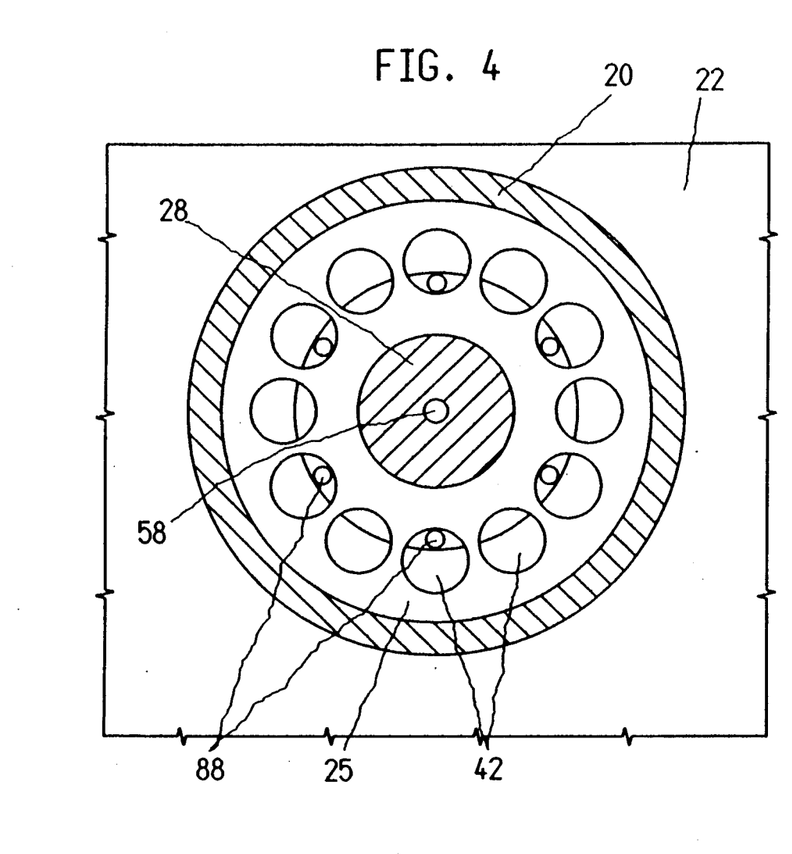
FIG. 4 is a sectional view taken on line IV-IV in FIG. 2.
Figure 5:
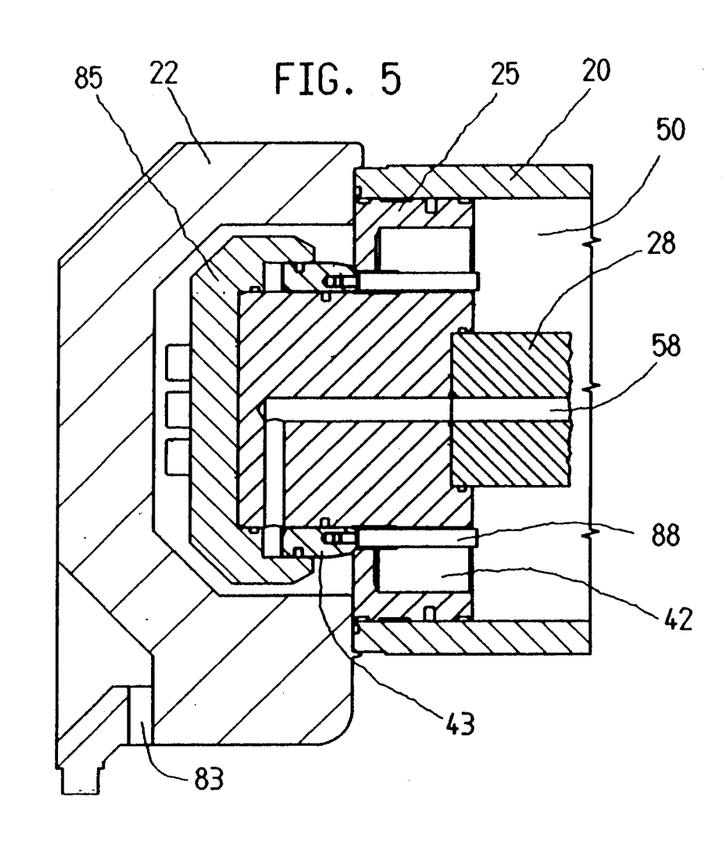
FIG. 5 is a vertical sectional view showing the arrangement of FIG. 4.
Figure 6:
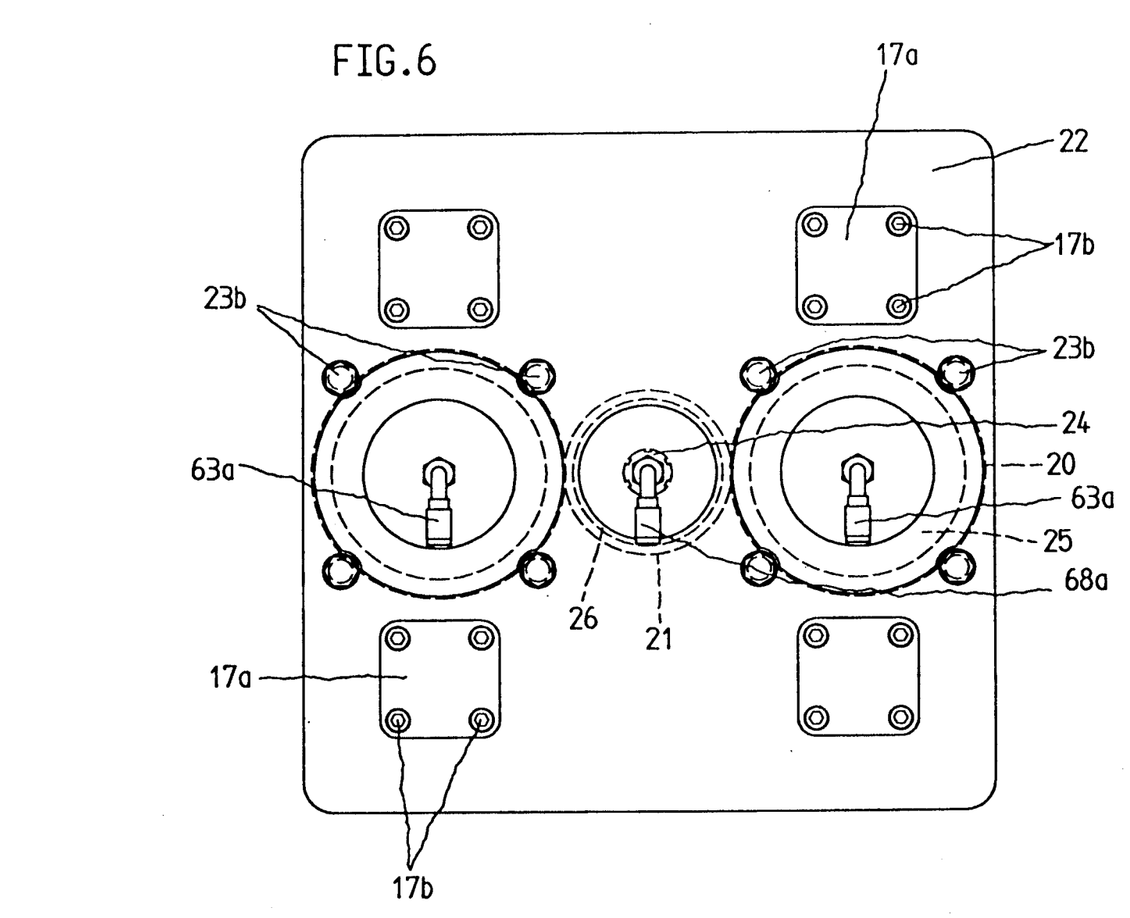
FIG. 6 is a rear elevation showing the clamping unit.

As is apparent from FIGS. 3 and 3a in conjunction with FIGS. 4 and 5, the valve member 43 is provided with pins 88, which are parallel to the axis of symmetry a—a and slightly protrude from the vertical forward end face of the locking piston 25 when the valve member 43 is in closing position. When the valve members 43 are closed said pins 88 will prevent a mechanical application of the locking pressure to the forward cylinder cover 12 because the tie rods 23 which interconnect the cylinder covers 22 and 12 (FIGS. 1, 6, 7) and are provided with heads 23b are not dimensioned to take up such a high load. During a normal injecting molding operation the injection mold 78 and the valve members 43 are moved to their closing positions so that the locking pressure can be built up before the locking pistons 25 engage the cylinder cover 12 to apply the locking pressure thereto. But an error in the program of the computer of the injection molding machine or replacement of a previously employed injection mold by one having a smaller depth without a corresponding change of the program may have the result that the locking pistons engage the forward cylinder cover 12 before the injection mold 78 is closed. In that case the valves 42, 43 will positively be opened as the pins 88 strike against the forward cylinder cover 12 so that the locking pressure cannot be built up and damage to the clamping unit will be avoided.

The communicating passage 68, which leads from the automatic control valve 64 to the rear cylinder chamber of the drive cylinder 27, can be connected by a directional valve 67 and a communicating branch passage 68b to the low-pressure chambers 50 when the force exerted by the drive cylinder is not sufficient to overcome the resistance which may be due to a sticking of the injection mold. As soon as the sticking has been eliminated the injection mold is opened by the drive cylinder as during a normal operation.

The lines 63 are connected by ports 63a to the high-pressure chambers 52. The line 68 is connected by a port to an end portion 68' of that communicating passage bore in the piston rod associated with the drive cylinder. The feed passages connected to the actuator for the ejector are designated 57.

I claim:

1. In a clamping unit for an injection molding machine, said clamping unit comprises
    a stationary mold carrier,
    a movable mold carrier reciprocable relative to said stationary mold carrier to and from a clamping position, and
    hydraulic actuating means for moving said movable mold carrier to and from said clamping position and for locking said movable mold carrier in said clamping position, said actuating means defining an axis of symmetry and comprising
    at least one hydraulic locking cylinder,
    a locking piston connected to said movable mold carrier and contained in and operable by said at least one hydraulic locking cylinder to lock said movable mold carrier in said clamping position, said locking piston in said at least one hydraulic locking cylinder defining a high-pressure chamber and a low-pressure chamber, said locking piston having at least one valve-controlled overflow passage connecting said high-pressure and low-pressure chambers, at least one hydraulic drive cylinder, operable to move said movable mold carrier to and from said clamping position; said at least one hydraulic drive cylinder being centered on said axis of symmetry and being connected to said movable mold carrier, at least one buffer cylinder, and a buffer piston contained in said at least one buffer cylinder and defining in said at least one buffer cylinder a buffer chamber, said buffer chamber communicating with said low-pressure chamber of said at least one locking cylinder, the improvement wherein said at least one buffer cylinder coaxially surrounds said at least one hydraulic drive cylinder, said buffer piston being mounted on said at least one hydraulic drive cylinder, said at least one hydraulic locking cylinder and said locking piston being symmetrically arranged with respect to said axis of symmetry, and a separate shut-off valve being operatively connected with said at least one hydraulic locking cylinder for shutting off said at least one valve-controlled overflow passage in said locking piston.

2. The improvement set forth in claim 1, wherein
said at least one buffer cylinder is centered on said axis of symmetry, and
said buffer piston is secured to said at least one hydraulic drive cylinder.

3. The improvement set forth in claim 1, wherein pilot valve means are provided for controlling the shut-off valve.

4. The improvement set forth in claim 3, wherein
said at least one hydraulic locking cylinder consists of a steel tube,
said locking piston comprising a skirt in sliding contact with said steel tube and a core having an outside peripheral surface and formed with said at least one valve-controlled overflow passage, and
said shut-off valve comprises a valve cup mounted on said core and an annular valve member, which is slidably mounted on the peripheral surface of said core and has one side facing said core; said valve member, said core and said valve cup defining a valve chamber; said valve member being movable to a closing position for closing said at least one valve-controlled overflow passage of said core and
said pilot valve is operable to supply fluid under pressure to and to pressure-relieve said valve chamber.

5. The improvement set forth in claim 4, wherein
said steel tube has a rear end that is remote from said movable mold carrier and is connected to a common rear cylinder cover,
said high-pressure chamber adjoins said common rear cylinder cover,
said rear cylinder cover is formed with a recess, which is open to said high-pressure chamber, and
said locking piston is movable to a position in which said core extends into said recess.

6. The improvement set forth in claim 1, wherein
said shut-off valve comprises a valve member, which is operable to close said at least one valve-controlled overflow passage of said locking piston and is provided with a plurality of spacing pins, which are parallel to said axis of symmetry and are arranged to protrude from said locking piston toward said movable mold carrier when said shut-off valve is closed.

7. The improvement set forth in claim 1, wherein
each of said at least one locking and buffer cylinders consists of a steel tube having a forward end facing said movable mold carrier and a rear end facing away from said movable mold carrier and
said steel tubes are connected to a common forward cylinder cover at said forward end and to a common rear cylinder cover at said rear end.

8. The improvement set forth in claim 7, wherein
said common rear cylinder cover has a recess, which is open toward said common forward cylinder cover and
said at least one hydraulic cylinder extending through said at least one buffer piston and into said recess.

9. The improvement set forth in claim 7, wherein
said clamping unit comprises four track rods, which are secured at one end to said stationary mold carrier and at an opposite end to said common rear cylinder cover,
said movable mold carrier is slidably mounted on and guided by said track rods,
said track rods comprise two lower track rods having axes lying in a horizontal plane and
said common forward cylinder cover is slidably mounted on and guided by said two lower track rods.

10. The improvement set forth in claim 9, in combination with an injection molding machine comprising a machine pedestal supporting said clamping unit, wherein
a vertical supporting plate extends between said common forward and rear cylinder covers and is carried by said machine pedestal and is provided with sleeves, and
said two lower track rods extend through and are slidable in said sleeves.

11. The improvement set forth in claim 7, wherein
said clamping unit comprises a mold having two mold parts carried by said stationary and movable mold carriers, respectively, and an ejector for ejecting moldings from said mold, further wherein
said steel tube of said at least one locking cylinder has a generatrix in contact with a generatrix of the steel tube of said at least one buffer cylinder,
said steel tube of said at least one locking cylinder and of said at least one buffer cylinder being centered on said common forward and rear cylinder covers and
said at least one hydraulic drive cylinder has adjacent to said movable mold carrier a forward end portion, which contains an ejector piston and together with said ejector piston constitutes an actuator for said ejector.

12. The improvement set forth in claim 7, wherein
said shut-off valve bounds a valve chamber adapted to be supplied with fluid pressure to close said shut-off valve,
said locking piston being formed with a piston passage communicating with said valve chamber and is connected to said movable mold carrier by a piston rod, which is formed with a piston rod passage communicating with said piston passage and is provided with a port which communicates with said piston rod passage and is disposed at a location which is disposed between said common forward cylinder cover and said movable mold carrier in any operating position of said locking piston relative to said common forward cylinder cover.

13. The improvement set forth in claim 1, wherein
said locking piston is formed with a centering recess, which is open toward said movable mold carrier and
said locking piston being connected to said movable mold carrier by a piston rod, which extends into said centering recess of said locking piston and into a centering recesses of said movable mold carrier and is centered by said recess.

14. The improvement set forth in claim 1, wherein
said at least one hydraulic drive cylinder has a forward portion adjacent to said movable mold carrier, a rear portion which is smaller in diameter than said forward portion, and an annular shoulder between said forward and rear portions and
said at least one buffer piston being secured to said at least one hydraulic drive cylinder at said annular shoulder.

15. The improvement set forth in claim 1, wherein
four hydraulic locking cylinders and associated locking pistons are provided,
two of said locking cylinders having axes contained in a horizontal plane extending through said axis of symmetry, and
the remaining two of said hydraulic locking cylinders have axes contained in a vertical plane extending through said axis of symmetry.

16. In a clamping unit for an injection molding machine, said clamping unit comprises
a stationary mold carrier,
a movable mold carrier reciprocable relative to said stationary mold carrier to and from a clamping position, and
hydraulic actuating means for moving said movable mold carrier to and from said clamping position and for locking said movable mold carrier in said clamping position, said actuating means defining an axis of symmetry and comprising
at least one hydraulic locking cylinder,
a locking piston connected to said movable mold carrier and contained in and operable by said at least one hydraulic locking cylinder to lock said movable mold carrier in said clamping position, said locking piston in said at least one hydraulic locking cylinder defining a high-pressure chamber and a low-pressure chamber, said locking piston having at least one valve-controlled overflow passage connecting said high-pressure and low-pressure chambers,
at least one hydraulic drive cylinder, operable to move said movable mold carrier to and from said clamping position; said at least one hydraulic drive cylinder being centered on said axis of symmetry and being connected to said movable mold carrier,
a drive piston slidably received in said at least one hydraulic drive cylinder,
at least one buffer cylinder, and
a buffer piston contained in said at least one buffer cylinder and defining in said at least one buffer cylinder a buffer chamber, said buffer chamber communicating with said low-pressure chamber of said at least one locking cylinder,
the improvement wherein
said at least one buffer cylinder coaxially surrounds said drive cylinder,
said buffer piston being mounted on said at least one hydraulic drive cylinder,
said at least one hydraulic locking cylinder and said locking piston being symmetrically arranged with respect to said axis of symmetry,
the improvement further comprising
a displacement sensor for detecting a displacement of said movable mold carrier relative to said stationary mold carrier,
fluid supply means for supplying pressure to said at least one hydraulic drive cylinder on opposite sides of said drive piston at the same time; said fluid supply means having fluid supply passages,
pressure sensors contained in said fluid supply passages for an overriding pressure control and
an automatic control valve for controlling the rate at which fluid is supplied to said at least one hydraulic drive cylinder on opposite sides of said drive piston in accordance with a program under the control of said displacement sensor to control the speed of said drive piston; said fluid supply passages leading from said automatic control valve to said at least one hydraulic drive cylinder on opposite sides of said drive piston.

17. The improvement set forth in claim 16, wherein
said drive piston defines in said at least one hydraulic drive cylinder a forward cylinder chamber adjacent to said movable mold carrier and a rear cylinder chamber remote from said movable mold carrier,
one of said fluid supply passages leading from said automatic control valve to said rear cylinder chamber and containing one of said pressure sensors,
a first directional valve is provided for connecting said one fluid supply passages to said high-pressure chamber of each of said locking cylinders,
a fluid reservoir is provided, and
a second directional valve is provided for connecting said low-pressure chamber of said at least one locking cylinder to said fluid reservoir.

18. The improvement set forth in claim 17, wherein
said pressure sensors are arranged to control delivery of fluid from said automatic control valve to said one fluid supply passage,
said fluid supply means comprise a fluid passage connecting said automatic control valve on an output side to said rear cylinder chamber of said at least one hydraulic drive cylinder, and
said second directional valve being operable to connect said automatic control valve for a supply of fluid to the low-pressure chamber of said at least one locking cylinder.

* * * * *